United States Patent Office 3,055,783
Patented Sept. 25, 1962

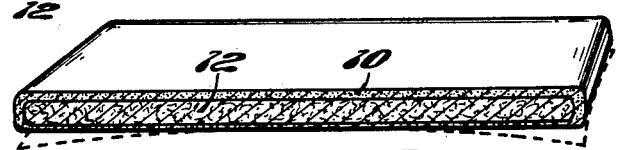
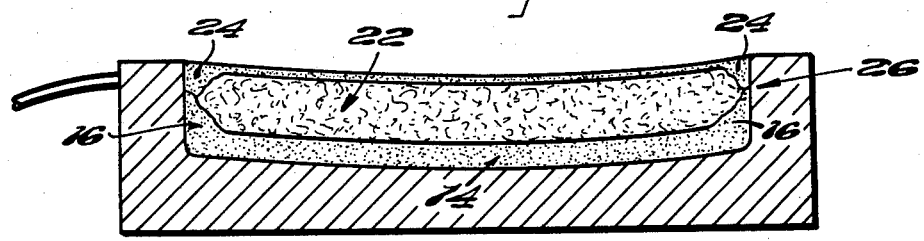
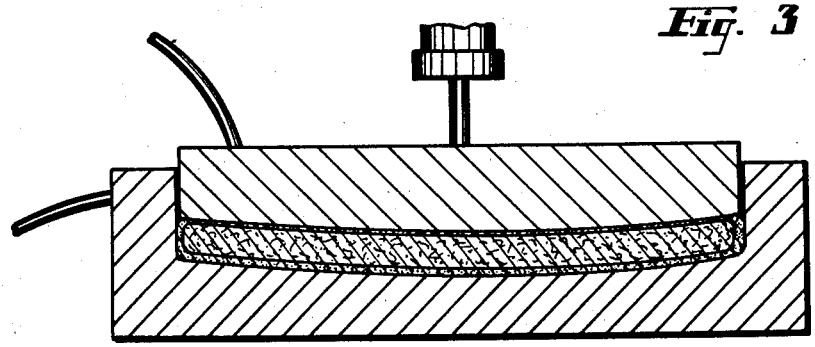
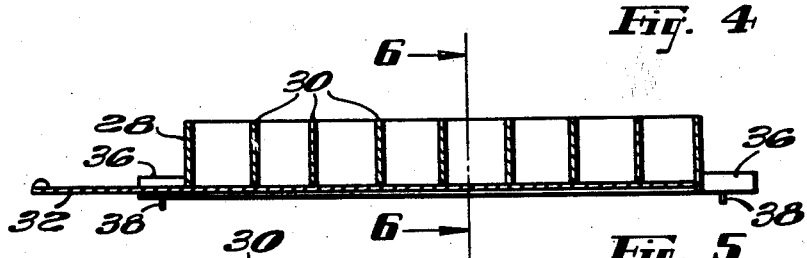
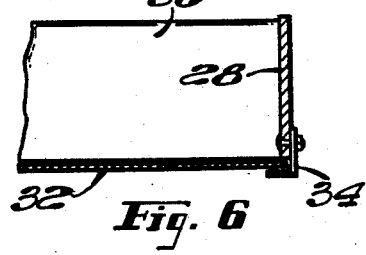

3,055,783
MOLDED PLASTIC ARTICLE
Severin B. Hendrickson and Paul J. Radigan, Templeton, Mass., assignors to Heywood-Wakefield Company, Gardner, Mass., a corporation of Massachusetts
Filed Jan. 12, 1959, Ser. No. 786,142
1 Claim. (Cl. 154—43)

This invention relates to molded articles, and more particularly molded articles in which the surface is composed of a relatively hard and brittle substance and the internal or core portions are relatively soft and strong. In one aspect this invention relates to a process for molding such articles, and in another aspect, this invention relates to apparatus for carrying out the process of making said articles. This application is a continuation in part of our co-pending application Serial No. 533,211, filed on September 8, 1955, now abandoned.

It is an object of our invention to provide a molded article suitable for use as a substitute for wooden elements hitherto employed in various components of furniture and the like. It is an object of our invention to provide such a molded article with an essentially hard, smooth and impervious surface that does not require special finishing, while at the same time providing the article with sufficient over-all strength to retain screws and adequately to resist all stresses and strains normally encountered in the components of furniture and the like. A further object of our invention is to provide such an article with an essentially hard and impervious surface without at the same time making the said surface feel cold and metallic when touched. An additional object of our invention is to provide such a molded article with improved qualities of resistance to wear and deterioration, and which will not bend, warp or crack in the presence of moisture.

Another highly important object is to provide a molded article the surface of which will not support combustion, but which if seared by fire or acids or scratched may be restored to its original finish by simple buffing and without requiring paint or lacquer.

In the accomplishment of these and other objects of the product of our invention in a preferred embodiment thereof, we employ a molded article comprising a fill or core portion of coarse hardwood fibers which have been sifted through a 16 mesh screen, and a surface portion employing a wood flour that has been sifted through a 60 mesh screen. These wooden substances are bonded together with a thermosetting resin, such as melamine formaldehyde, with the surface portion entirely surrounding the coarser core portion. The resulting product has a hard, durable weather-proof and fireproof surface and is amply strong to hold screws and resist all stresses and strains normally encountered in the conventional furniture components and the like. In addition, this product, while being slightly hygroscopic, does not bend, warp or swell when in contact with water and furthermore, while the surface is hard and durable, it does not have a cold or metallic feel when touched.

Still another feature of the product of our invention is that its molded surface is smooth and clear, not requiring further finishing steps customarily carried out in the manufacture of wooden furniture components. And since the coloring matter extends uniformly throughout the mass, the surface may be restored by simple buffing and without requiring paint.

The process of our invention is generally directed to the solution of the problems presented in the production of the above-mentioned article. One of these problems relates to the relationship between the surface and core portions of the molded article. These two portions must be integrally bonded so that during use there is no tendency whatsoever for the surface portion of the article to peel off or shift in any way relative to the stronger core portion. Furthermore, the surface portion must entirely cover the core portion without the core portion cropping through in local areas. Therefore, it is the principal object of the process of our invention to provide a method for molding the above-mentioned article which will result in a virtually integral bonding between the surface and core portion of the article without the core portion cropping through the surface and with a clear surface free of lines.

In the accomplishment of these and other objects of the process of our invention, we employ a core mixture comprising approximately two parts by weight of wood fibers sifted through a 16 mesh screen to one part by weight of a thermosetting resin, such as melamine formaldehyde, in powdered form. The surface mixture employed in the process of our invention consists in approximately equal parts by weight of hard wood flour sifted through a 60 mesh screen and a thermosetting resin, such as melamine formaldehyde, in powdered form. The surface and core mixtures are then placed in a hot mold in the powdered form with the surface mixture entirely surrounding the core mixture, and thereafter both are cured under heat and pressure.

There are two points of relatively critical importance to the process of our invention. The first relates to the size of the wood fibers in the core portion. Large sized core particles are desirable for purposes of strength in the finished articles, but we have found that the larger the particles are, the more they tend to bunch in the mold under heat and compression and crop through the surface portion during molding. On the other hand, when wood fibers that have been sifted through a 16 mesh screen are employed in the core mixture, they do not crop through the surface layer during molding. A second factor of importance to the process of our invention relates to the speed in which the material to be molded is placed in the mold. It is essential that the surface material and core material be loaded uniformly into the mold and with sufficient speed to avoid localized partial curing of the surface mixture prior to application of the final molding pressure. Since the surface material entirely surrounds the core material, it is impossible to fill the mold with these components simultaneously and since they must be entered into the mold in sequence, the sequence must be carried out rapidly before the resins in the surface mixture have substantially commenced to cure. We accomplish this in the process of our invention by first covering the sides and bottom of the mold with the surface mixture, then filling the central portion of the mold with the core mixture, and finally covering the top area of the mold with the surface mixture in less than one minute. Other lesser features of the process of our invention include the use of a small percentage of zinc stearate as a mold lubricant during the molding process. The zinc stearate also serves as a water resistant component in the final product.

Similarly, the apparatus of our invention is generally directed to solving the problems presented by the process of our invention, and the principal object thereof is the provision of apparatus for rapidly filling a mold with a surface substance in one form and a core substance in another form without permitting the two portions to intermingle to the extent that the core portion crops through the surface portion.

In the accomplishment of these and other objects of the apparatus of our invention in a preferred embodiment thereof, we employ a mold ring held within the mold and providing a wall which separates the side portions of the mold from the central portion and which extends downwardly into the mold only to the extent that the core portion is intended to extend. In conjunction with the mold ring, we provide a first rack which includes in its organization a bottom compartment coextensive with the bottom of the mold and dimensioned to receive and hold the surface material destined for the bottom of the mold. The first rack also is provided with vertical side compartments which similarly hold the material destined for the side areas of the mold. The bottom of the said first rack is provided with a sliding baffle and the mold is filled with the contents of the first said rack by placing the same over the mold and over the mold ring, and thereafter withdrawing the sliding baffle and permitting the material carried by the first said rack to fall in place in the mold. In order to place the core mixture in the central area of the mold, we employ a second filling rack for receiving and holding the material destined for the core portion of the mold. The said second rack is likewise provided with a sliding baffle along its bottom and the mold is filled with the core mixture by placing the second rack over the mold ring and withdrawing the baffle. A third rack is employed for covering the entire mold with the surface mixture and includes a compartment for receiving and retaining the material destined for the upper surface of the mold. The said third rack also is provided with a sliding baffle in its bottom, and the contents of the third rack are applied to the mold by first carefully removing the mold ring, and thereafter by placing the third rack over the mold and withdrawing the baffle.

It is a feature of our invention that each of the above said racks is provided with transversely extending partitions spaced closely together and serving the purpose of preventing any major shift of the materials being loaded while the various baffles are being withdrawn from the racks. With the aparatus of our invention, the mold may be loaded rapidly and with essentially uniform layers of surface and core material in intimate contact with each other, and without giving rise to any tendency for the core material to crop out through the surface material. Furthermore, this loading operation may be accomplished in a heated mold in substantially less than one minute and before the resin in the surface material can commence to cure prematurely.

Further obejcts and features of our invention will be best understood and appreciated from the following detailed description of a preferred embodiment thereof, selected for purposes of illustration and shown in the accompanying drawings in which:

FIG. 1 is a partially sectioned view in perspective of a molded article of our invention in the general form of a chair back element;

FIG. 2 is a similar view of a molded article suitable for a desk or table top;

FIG. 3 is a sectional view in side elevation of a mold loaded with powdered materials preparatory to application of pressure for molding the article shown in FIG. 2;

FIG. 4 is a sectional view in side elevation of a mold containing the materials for fabricating the article of FIG. 2 under heat and pressure;

FIG. 5 is a sectional view in side elevation of a mold filling rack for loading coarse material in the core area of the mold shown in FIGS. 3 and 4;

FIG. 6 is a fragmentary sectional view in end elevation along the lines 6—6 of FIG. 5;

THE ARTICLE

Figure 7:
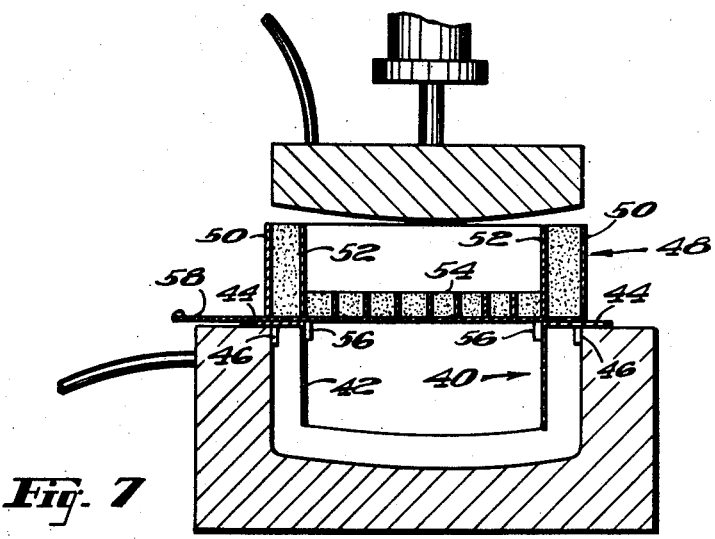
FIG. 7 is a sectional view in side elevation of a mold for fabricating the article shown in FIG. 1 showing a loading rack in position preparatory to loading the mold with a surface mixture for the bottom and sides of the mold.

The preferred embodiment of the article of our invention herein shown may be fabricated in many forms. In FIG. 1 we have shown an element formed with a curved contour suitable for use as a chair back, and in FIG. 2 we have shown a flat element suitable for a desk or table top. In FIGS. 1 and 2 we have shown the end of the article cut open to expose the internal cross section of the article which comprises a surface portion 10 and a core portion 12. In one embodiment of the form shown generally in FIG. 1, the surface portion both on the top and bottom of the article is approximately 1/8" thick and the core portion is 3/8" thick. The surface portion is composed of substantially 60 mesh wood flour and cured melamine formaldehyde resin in equal proportions by weight, and the core portion 12 comprises two parts by weight of 16 mesh wood fibers to one part by weight of cured melamine formaldehyde resin. Since the surface portion 10 and core portion 12 are placed in the mold in a powdered form and are cured simultaneously, the surface portion 10 is intimately and virtually integrally bonded to the core portion 12 so that there is no tendency for the surface portion 10 to pull away from the core portion 12 in any way.

While the wood fibers in the core portion 12 may be regarded as 16 mesh in size, it will be understood that this limitation refers only to the smallest dimension of the largest wood particles in this area. These particles are obtained by sifting them through a 16 mesh screen, and therefore, it is quite feasible for substantially long fiber particles to pass through the screen as long as the transverse dimension of such particlese is less than the width of the openings of the 16 mesh screen. Of coures, it will be understood also that the core portion 12 includes numerous other smaller particles, the range being substantially between 16 and 60 mesh. The same is substantially true with regard to the surface portion 10, but since the wood particles employed in that portion are sifted through a 60 mesh screen, we have chosen to term the wood particles in that area "wood flour" rather than wood fibers. By and large, it is extremely difficult to notice any substantial length in the wood particles employed in the surface portion 10. Since the wood flour particle size range is substantially the same as the coarser wood fibers of portion 12, they range between about 60 and 225 mesh.

The molded article of our invention has numerous highly advantageous properties. While the surface portion 10 is essentially hard and brittle, the over-all structure of the article is substantially strengthened by the core portion 12 wherein the strength of the longer wood fibers renders the entire article highly durable and resistant to all normal stresses and strains encountered in various components of furniture and the like. The article is fully capable of holding and retaining self-tapping sheet metal screws and the surface of the article, as it comes from the mold, is smooth and clear and does not require special finishing operations normally carried out in conventional furniture components. Of course, a slight ridge often remains after the article is taken out of the mold in the area along the line between the male and female members of the mold. Since the coloring matter extends uniformly throughout the mass, scratches, blemishes, fire or acid marks, or the like may be buffed off and the surface restored to its original condition without requiring paints or lacquer.

With regard to the characteristics of the surface of the article of our invention, we find that it tests between 61 and 63 on a "Barcol impressor" hardness tester, and by comparison it is approximately twice as hard as the conventional Bakelite telephone hand piece which tests approximately 30 on the same equipment. By way of further comparison, we find that a penny tests at approximately 75, a nickel 83, and conventional "Formica" tests at about 58 on the same testing equipment. While the surface is thus very hard, it is further to be noted that the surface does not feel cold or metallic, and we attribute this to the fact that the wood and resin are poor conductors and the article is slightly porous. On the other hand, while this porosity renders the article slightly hygroscopic, it does not swell in the presence of moisture nor does it warp or bend. We believe this is due to the high percentage of resin and the intimate bond between it and the wood fibers. Apparently the resin completely surrounds and holds the wood fibers against expansion by forming a lattice work of resin throughout the mass of sufficient strength to hold the wood particles from expansion.

In FIG. 2 we have shown an article suitable for use as a desk or table top, and in one embodiment thereof the surface portion 10 on the top is 1/8" thick, while on the bottom it is only 1/16" thick. In this embodiment, the core portion 12 is 7/16" thick. We have found that when the surface portion 10 is not the same thickness on the top as on the bottom, the article warps during cooling presumably as a result of the difference in the contraction of cooling between the surface portion and the core portion. Therefore, in molding the article shown in FIG. 2, we impart a predetermined curve to the article which disappears when the article cools after molding. However, we wish to point out that the tendency of the surface portion 10 to contract may well be one of the reasons why the article of our invention has such highly advantageous properties of strength and durability. The contraction of the surface portion 10 necessarily sets up strains between itself and the core portion 12 and in this way somewhat pre-tensions the reinforcing fibers of the core portion 12 so that a greater factor of their linear tensile strength is imparted to the final structure.

It should be further noted that the wood particles employed in the surface portion 10 of the article of our invention are derived from hardwood shavings and sawdust. We regard this as a highly important feature of our invention and believe that it contributes materially to the hardness of the surface. In addition, we employ hardwood fibers in the core portion 12.

The article of our invention also includes between .5 and 1% zinc stearate. The function of the zinc stearate is two-fold. It acts as a mold lubricant in the process of our invention, but it also helps to make the finished product more water resistant. The article of our invention may be given various attractive colors including green, brown, and natural color by adding approximately 10% coloring matter to be described more in detail below.

The coloring matter is mixed uniformly throughout the mass in both the surface and core portions, and even where natural wood color is desired added coloring matter is necessary to offset the color of the resin.

THE PROCESS

The preferred form of the process of our invention is carried out by grinding hardwood shavings and sawdust into relatively fine particles. These particles are then screened to provide a coarse form, the particles of which range in size of their smallest dimension between 16 and 60 mesh, and a fine form in which all of the particles have passed through a 60 mesh screen. The coarse form is then mixed with a powdered melamine formaldehyde resin which we purchase under the trademark "Lauxite (MF-325 or RB-096)" in a ratio of approximately two parts by weight of wood to one part of weight of resin. The fine form is mixed separately with the same resin in powdered form and in a ratio of approximately equal proportions by weight. Zinc stearate and coloring components are also included and the various mixtures are individually tumbled to provide a thorough distribution of the various components of the mixtures.

While we do not desire to be bound by the precise percentages of various components of the mixtures employed in the process of our invention, the following table represents components and proportions employed in operative embodiments of our invention.

Coarse Mixture

DESK TOPS

| Green | Natural | Brown |
| --- | --- | --- |
| (2-1 ratio) | (2-1 ratio) | (2-1 ratio) |
| 41 lbs. chips (wood). | 40 lbs. chips (wood). | 50 lbs. chips (wood). |
| 25 lbs. resin (MF-325). | 25 lbs. resin (MF-325). | 25 lbs. resin (MF-325). |
| 1/2 lb. zinc stearate. | 1/2 lb. zinc stearate. | 1/2 lb. zinc stearate. |
| 9 lbs. color. | 10 lbs. color. | |

SEAT BACKS

| Green | Natural | Brown |
| --- | --- | --- |
| (2 1/4-1 ratio) | (2 1/4-1 ratio) | (2 1/4-1 ratio) |
| 50 lbs. chips (wood). | 50 lbs. chips (wood). | 56 lbs. chips (wood). |
| 25 lbs. resin (MF-325). | 25 lbs. resin (MF-325). | 25 lbs. resin (MF-325). |
| 1/2 lb. zinc stearate. | 1/2 lb. zinc stearate. | 1/2 lb. zinc stearate. |
| 9 1/2 lbs. color. | 10 lbs. color. | |

| Green color | Natural color |
| --- | --- |
| 60 lbs. flour (wood). | 60 lbs. flour (wood). |
| 20 lbs. titanox (RA-50). | 35 lbs. titanox (RA-50). |
| 15 lbs. Hudson green (A-701). | 5 lbs. lemon (X-2548). |

Fine Mixture

DESK TOPS

| Green | Natural | Brown |
| --- | --- | --- |
| (1-1 ratio) | (1-1 ratio) | (1-1 ratio) |
| 50 lbs. flour (wood). | 50 lbs. flour (wood). | 50 lbs. flour (wood). |
| 50 lbs. resin (MF-325). | 50 lbs. resin (MF-325). | 50 lbs. resin (MF-325). |
| 1/2 lb. zinc stearate. | 1/2 lb. zinc stearate. | 5 lbs. zinc oxide. |
| 2 1/2 lbs. titanox (RA-50). | 5 lbs. titanox (RA-50). | 1/2 lb. zinc stearate. |
| 2 lbs. Hudson green (A-701). | 10 ozs. lemon (X-2548). | |

SEAT BACKS

| Green | Natural | Brown |
| --- | --- | --- |
| (1 1/4-1 ratio) | (1 1/4-1 ratio) | (1 1/4-1 ratio) |
| 63 lbs. flour (wood). | 63 lbs. flour (wood). | 63 lbs. flour (wood). |
| 50 lbs. resin (MF-325). | 50 lbs. resin (MF-325). | 50 lbs. resin (MF-325). |
| 1/2 lb. zinc stearate. | 1/2 lb. zinc stearate. | 5 lbs. zinc oxide. |
| 2 1/2 lbs. titanox (RA-50). | 5 lbs. titanox (RA-50). | 1/2 lb. zinc stearate. |
| 2 lbs. Hudson green (A-701). | 10 1/2 ozs. lemon (X-2548). | |

The steps involved in carrying out the process of our invention after the various mixtures have been compounded are shown diagrammatically in FIGS. 3, 4, 7, 8 and 9. A suitable mold is heated by super-heated steam to approximately 290° F. and the bottom of the mold is covered with the fine mixture indicated in FIGS. 3 at 14. It will be noted that the steps taken in filling the mold are slightly different depending on whether the article of FIG. 1 or 2 is to be manufactured. The form shown in FIGS. 3 and 4 is for manufacturing the article of FIG. 2. In this form, the fine mixture indicated at 14 is placed in the bottom of the mold and side areas thereof, indicated at 16, are formed up along the side of the mold by hand. In the embodiment shown in FIGS. 7, 8 and 9 for the production of the article of FIG. 1, the fine mixture is deposited on the bottom and along the sides of the mold at 20 by means of apparatus which will be described further in detail below. Once the bottom and sides of the mold have been covered with the fine mixture, the coarse mixture is deposited in the mold as indicated at 22 in FIG. 3, and generally concentrated inwardly from the side edges of the mold itself. Thereafter the fine mixture is applied to the top portion of the mold completely covering and surrounding the coarse mixture with side areas thereof extending downwardly at 24 in FIG. 3. This operation is carried out promptly by means of the apparatus presently to be described, and must be accomplished in substantially less than a minute's time in order to prevent the resin in the area indicated at 26 in FIG. 3 from prematurely commencing to cure. It will be understood that if the resin at the area 26 cures prematurely, a resultant blemish or line will appear on the surface of the finished product. In FIG. 4 we have shown a male member of the mold compressing the substances in the mold, and we find that a fluid pressure of between 700 and 1500 p.s.i. is necessary to accomplish a proper formation of the article. Generally speaking the larger the area of the article, the more pressure is required. In terms of pounds per square inch on the molded article itself, this ranges from 300 p.s.i to 600 p.s.i.

While it will be understood from the foregoing paragraphs that the article of our invention is strengthened by employing larger particles in the core portion 12, we find that if particles larger than the 16 mesh wood fibers above described are employed, there is an apparent bunching or internal resistance of clumps of such fibers which results in forcing the coarser fibers to the surface through the fine mixture during the curing process. Of course, it is to be understood that finer fibers may be used in the core portion 12 without causing the core portion 12 to crop out through the surface portion 10, but the over-all strength of the finished articles will then be reduced. Thus, we prefer to use the 16 mesh particles as described in order to obtain maximum strength without causing the core portion to crop out through the surface, but we do not desire to be limited strictly to the 16 mesh size. It is entirely feasible to use 20 to 30 mesh fibers in the core portion without departing from the spirit of our invention, but yet it will be understood that a weaker product will result. We also wish it to be understood that fibers coarser than the 16 mesh fibers above described may be used in the core portion if the surface portion 10 is increased in thickness or if its fibers are slightly coarser. Thus when we say "substantially 16 mesh wood fibers" and "substantially 60 mesh wood flour," we wish the above variations to be included in the concept. The points of importance in this regard are that the core and surface portions are deposited in the mold in powdered form and cured simultaneously under heat and pressure. In addition, the size of the wood particles in the core must be small enough to prevent an outcropping through the surface portion, but must be large enough to render the core portion the principal strength member of the article.

With regard to the time that the article remains under heat and compression in the mold, we find that the resin cures in approximately 10 to 10½ minutes depending upon the thickness of the article.

The preferred form of the process of our invention employs melamine formaldehyde resin in powdered form. However, in the core portion other forms of powdered thermosetting resins, such as phenol formaldehyde, urea formaldehyde and the like, may be employed in addition, and in various combinations.

We have previously mentioned that the article shown in FIG. 2 is molded as in FIGS. 3 and 4 with a slight curvature, and that during cooling, the article flattens out. We find that the change of shape during cooling takes place quite uniformly and therefore, the mold is given a substantially spherical or inverted double type of curve. When a desk top having a dimension of 18" x 24" is fabricated having top, core and bottom layers respectively ⅛", ⁷⁄₁₆" and ¹⁄₁₆" thick, the diagonal line of the mold is curved approximately ¼", the 24" side is curved approximately ⅛", and the 18" side is curved approximately ³⁄₃₂". Desk tops molded in this manner are placed in an insulated box designed to permit the desk tops to cool gradually to room temperature over a 24 hour period.

THE APPARATUS

The apparatus of our invention is shown in FIGS. 5-9 and has as its principal purpose the provision of means for rapidly loading molds with various layers of substances in powdered form while at the same time keeping these substances segregated from each other. For this purpose we employ filling racks in various forms. The form shown in FIGS. 5 and 6 is employed to put the coarse mixture into the mold shown at 22 in FIG. 3. The rack of FIGS. 5 and 6 includes in its general organization side and end walls 28 conforming generally to the contour of the coarse mixture area of the mold. Partition elements 30 are connected to the side walls 28 and extend transversely across the filling rack. The bottom of the filling rack is provided with a baffle 32 which is retained in free sliding relation adjacent to the bottom of the side and end walls 28 by means of overlapping angle elements 34. The filling rack shown in FIGS. 5 and 6 is supported over the mold in accurate registration by means of end extensions 36 which are centered over the mold by depending lugs 38. Thus when it is desired to fill the mold with coarse mixture as may be seen at 22 in FIG. 3, the rack of FIGS. 5 and 6 is fully loaded with the coarse mixture, and placed over the mold, thereafter the baffle 32 is withdrawn. As the baffle 32 pulls out of the rack, the material in the rack drops down into the mold and it will be seen that the partitions 30 prevent any substantial shifting of the material in the rack at that time.

It will be understood that a filling rack similar to that shown in FIGS. 5 and 6, but of lesser height and greater area is employed in depositing the fine material indicated at 14 in FIG. 3. We have not shown it specifically herein because its elements are substantially the same as the rack shown in FIGS. 5 and 6, and its construction will be fully understood by inspection of the two said figures.

Figure 8:
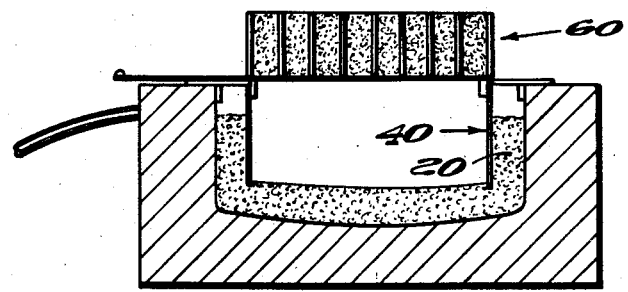
FIG. 8 is a view similar to FIG. 7 showing a loading rack in position preparatory to loading the core mixture.
Figure 9:
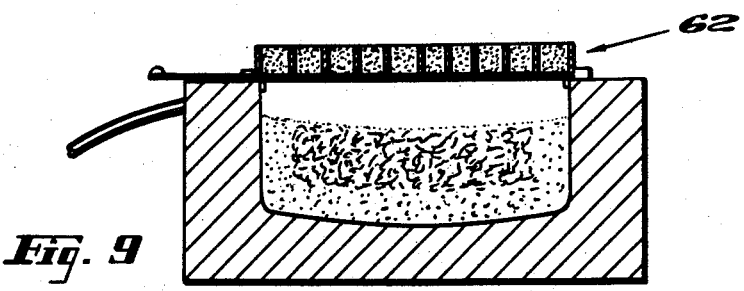
FIG. 9 shows the same except that a loading rack is in position preparatory to loading the surface mixture for the top of the mold.

When a deeper mold is to be filled we employ the apparatus and filling racks shown generally in FIGS. 7-9 together with a mold ring indicated at 40. The mold ring 40 includes a depending side wall 42 which extends entirely around the mold and is spaced from the sides thereof by a suitable distance depending upon the desired thickness of the surface portion on the ends of the finished article. The mold ring 40 is supported within the mold by laterally extending prongs 44 which overlay the mold and which are held in place by appropriately positioned depending lugs 46 secured to the prongs 44. The first step in the filling of the mold in this manner is accomplished by placing a side and bottom filling rack indicated at 48 in FIG. 4 over the mold ring 40. The filling rack 48 is provided with side and end walls 50, and inner partitions 52 of the same general contour and vertical dimensions as the walls 42 of the mold ring 40, transverse partitions 54, depending positioning lugs 56, and a sliding baffle 58 which is positioned and held in a manner similar to the sliding baffle 32 of the rack shown in FIGS. 5 and 6. The rack 48 is filled preparatory to loading the mold with the fine mixture with the space between the walls 50 and 52 being loaded to the top and with the central portion of the rack between the partitions 54 being loaded evenly to the top of the said partitions. Thereafter the rack 48 is placed over the ring 40 in the mold and the baffle 58 is withdrawn thereby permitting the fine material to drop down into the mold as may be seen in FIG. 8. The next step in loading the mold is carried out with a coarse mixture filling rack indicated in FIG. 8 at 60. The rack 60 is essentially the same construction as that shown in FIGS. 5 and 6 and will not be described in detail. It likewise is loaded to the top with the coarse mixture preparatory to filling the mold. Whereupon it is placed over the mold ring 40 and the coarse mixture carried therein drops down into the mold when the sliding baffle of the filling rack 60 is withdrawn. Once the coarse mixture has been deposited into the mold, the rack 60 and the mold ring 40 are withdrawn and the fine mixture is deposited on the top area of the mold by means of a third rack indicated at 62 in FIG. 9. The construction of the rack 62 is similar to those previously described, and therefore, it will not be described herein in detail. It will be undrstood that when the rack 62 is loaded and placed into position, a sliding baffle in the bottom thereof is withdrawn and the fine mixture contained in the rack 62 will then be deposited on the top surface of the mold.

With the apparatus of our invention herein described, we find that the mold may be loaded with powdered material in accurately controlled layers so that the coarse mixture in the center of the mold does not tend to crop out of the fine mixture adjacent to the sides and bottom of the mold. In addition to this, the filling racks may be loaded by hand in advance and the entire operation of filling the mold may be carried out accurately and rapidly before the resin contained in the mixtures in the mold have commenced to cure.

Since numerous minor variations of this preferred embodiment of our invention will now be apparent to those skilled in the art, it is not our intention to confine the invention to the precise forms herein shown, but rather to limit it in terms of the appended claim.

Having thus disclosed and described a preferred embodiment of our invention, what we claim as new and desire to secure by Letters Patent of the United States is:

A molded article comprising: a core portion consisting essentially of two parts by weight of ground hardwood fibers having a transverse dimension ranging between about 16 and 60 mesh, approximately one part by weight of thermosetting resin selected from the group consisting of phenol formaldehyde, urea formaldehyde, and melamine formaldehyde, and a substantial percentage by weight of the core portion of dry powdered coloring matter; a surface portion integrally bonded to and substantially completely surrounding said core portion consisting essentially of equal parts by weight of ground hardwood flour having a transverse dimension ranging between about 60 and 225 mesh, and melamine formaldehyde; said dry powdered coloring matter also in said surface portion in substantially the same proportion; said components of said core and surface portions being thoroughly and uniformly mixed individually whereby said coloring matter is uniformly distributed throughout said molded article; said components in both said core and surface portions also being cured and in integral association as by curing the core and surface portions from a powdered form to a composite mass under a pressure of at least 300 p.s.i. in the mass itself and under a temperature of at least about 290° F.; said core portion being relatively strong compared to said surface portion and said surface portion being relatively hard and brittle compared to said core portion and both said portions being in mutually cooperative, supporting relationship; said article being slightly hygroscopic; and said resin in both said surface and core portions surrounding said particles and forming a lattice-work of resin in said article of sufficient strength around said particles to retain said particles from expansion in the presence of moisture.

References Cited in the file of this patent

UNITED STATES PATENTS

| | | |
|---|---|---|
| 1,763,653 | Harvey et al. | June 17, 1930 |
| 2,066,734 | Loetscher | Jan. 5, 1937 |
| 2,067,012 | Loetscher | June 5, 1937 |
| 2,379,163 | Landon | June 26, 1945 |
| 2,582,730 | Wohnsiedler et al. | Jan. 15, 1952 |
| 2,584,177 | Wohnsiedler et al. | Feb. 5, 1952 |
| 2,642,371 | Fahrni | June 16, 1953 |
| 2,851,730 | Wilhelmi et al. | Sept. 16, 1958 |